Patented July 3, 1945

2,379,413

UNITED STATES PATENT OFFICE 2,379,413

AMIDES OF HIGH MOLECULAR WEIGHT CARBOXYLIC ACIDS

Theodore F. Bradley, Stamford, Conn., assignor to American Cyanamid Company, New York, N. Y., a corporation of Maine No Drawing. Application June 28, 1940, Serial No. 342,946

8 Claims. (Cl. 260—404.5)

This invention relates to the production of amides of high molecular weight carboxylic acids, but more particularly to polyamides or mixed polyamide-polyester resins.

An object of this invention is to prepare amides of carboxylic acids which are polymers of polyene fatty acids.

An important object of this invention is to prepare polyamide resins or mixed polyamide-polyester resins which are suitable for use in a wide variety of commercial applications such as plasticizers in coating compositions, modifiers for fibers or films of the known type of polyamides, etc.

These and other objects are attained by reacting ammonia, a primary or secondary amine, a hydroxylamine or an alkylolamine with a high molecular weight carboxylic acid or esters thereof, either saturated or unsaturated, said acid or esters being obtainable by polymerizing at elevated temperature a polyene fatty acid or esters thereof and in the case of the esters, converting the polymers to the corresponding acid if desired. Optionally, the high molecular weight acids or esters thereof may be hydrogenated in order to produce saturated compounds. In this way amides or polyamides of dicarboxylic acids containing 36 carbon atoms and of tricarboxylic acids containing 54 carbon atoms, etc., are obtained.

The following examples in which the proportions are in parts by weight are given by way of illustration and not in limitation.

Example 1

800 parts of the methyl esters of tung oil fatty acids are heated, preferably in an atmosphere of carbon dioxide or other inert gas, to a temperature of about 300° C. in approximately 40 minutes and the temperature is maintained at this point for about one-half hour. The relatively volatile and unpolymerized esters are removed by distillation at about 1–5 mm. of mercury absolute pressure, leaving a residue containing 415–420 parts of non-volatile polymerized esters.

68 parts of this residue of non-volatile polymerized esters and 11.1 parts of an aqueous solution of ethylene diamine (70.1% diamine) are heated at about 200° C. for about 4 hours, preferably in an inert atmosphere. A soft resinous plastic product is obtained which is suitable as a plasticizing agent for nitrocellulose.

Example 2

800 parts of the methyl esters of tung oil fatty acids are heated, preferably in an atmosphere of carbon dioxide or other inert gas, to a temperature of about 300° C. in approximately 40 minutes and the temperature is maintained at this point for about one-half hour. The relatively volatile and unpolymerized esters are removed by distillation at about 1–5 mm. of mercury absolute pressure, leaving a residue containing 415–420 parts of non-volatile polymerized esters.

To 300 parts of the polymerized esters thus obtained, 5–30 parts of a nickel catalyst are added and the mixture is placed in a suitable pressure vessel and charged with hydrogen to a pressure of about 1000–2000 pounds per square inch. Hydrogenation is complete when heated at 100–200° C. for about 5–10 hours. In this way, polymers of the methyl esters of the saturated tung oil fatty acids may be obtained.

68 parts of the hydrogenated polymerized methyl esters and 11.1 parts of an aqueous solution of ethylene diamine (70.1% diamine) are heated at about 200° C. for about 4 hours, preferably in an inert atmosphere. A balsam-like resin is obtained which has a slightly higher viscosity than the product prepared according to Example 1.

Example 3

800 parts of the methyl esters of tung oil fatty acids are heated, preferably in an atmosphere of carbon dioxide or other inert gas, to a temperature of about 300° C. in approximately 40 minutes and the temperature is maintained at this point for about one-half hour. The relatively volatile and unpolymerized esters are removed by distillation at about 1–5 mm. of mercury absolute pressure, leaving a residue containing 415–420 parts of non-volatile polymerized esters.

33 parts of this residue of non-volatile polymerized esters, 10.2 parts of an aqueous solution of ethylene diamine (70.1 diamine) and 59 parts of sebacic acid were heated together at about 200° C. for about 4 hours. A wax-like, solid resinous product is formed, having many of the properties characteristic of the known fiber-forming polyamides. The product is somewhat more flexible, however, and has a slightly lower melting point than ethylene diamine-sebacate.

Any polyene fatty acid or its ester or mixtures thereof in any desired proportion or as they happen to occur in the natural drying oils may be treated in the same general manner as set forth in the above examples to produce amides. The most important of these are in octadecadienic or octadecatrienic fatty acids or their esters, but the polymeric fatty acids containing 20, 22 and 24 carbon atoms found in fish oils are also suitable, as well as the relatively short chain aliphatic acids, e. g., sorbic acid.

The lower monohydric alcohol esters of the polyene carboxylic acids are preferred since they give the best yields and do not decompose or gel, but the acids themselves, as well as the glycol esters and the glycerides may be used. The acids themselves tend to decompose to some extent, particularly at the carboxyl groups and therefore are generally less desirable from a commercial point of view. On the other hand, the glycerides and to a lesser extent the glycol esters tend to gel before the polymerization reaction is complete. Accordingly, with the latter esters, inferior yields of polymerized products are obtained. Even esters of aromatic or heterocyclic acids may be used, such as the benzyl or furfuryl esters, but, in general, there is no particular advantage in their use.

While the higher aliphatic alcohol, for example, stearyl alcohol, esters may be employed, it has generally been found that somewhat better results are obtained if the lower aliphatic esters be used. Accordingly, the preferred esters are those derived from methanol, ethanol, propanol, etc.

Examples of the polyene fatty acids which are polymerized, preferably in esterified form, are the following: 9,11- and/or 9,12-octadecadienic acid (obtainable from soya-bean oil and dehydrated castor oil), linolenic acid (obtainable from perilla oil, linseed oil and other drying oils), alpha- and beta-eleostearic acid (obtainable from tung oil), etc.

If esters of the polyene fatty acids be employed, such esters may be produced by direct esterification of the fatty acid with the alcohol which has been selected, but it is generally more economical and convenient to produce the esters by mixing the alcohol with a natural drying oil, together with a trace of alkali hydroxide, hydrogen chloride or other esterification catalyst and thereby effect an alcoholysis or ester interchange by simply heating.

If methyl or ethyl esters of the polyene acid be utilized, I have found that temperatures between about 250° C. and 350° C. are suitable for polymerization. The time required for this polymerization varies not only with the temperature but with the acid and the particular ester which is used. Generally, a period of from about one-half hour to about 50 hours is suitable and in most instances, the polymerization may be effected in not over 12 hours. If a conjugated unsaturated ester, such as the methyl ester of eleostearic acid be employed, a sufficient degree of polymerization may be obtained in about one-half hour at 300° C., whereas the methyl linolenates and linoleates generally require from about 5 to 12 hours or more. To speed up the polymerization process suitable catalysts may be added, examples of which are: Fuller's earth (preferably acid-treated), bentonite (preferably acid-treated), stannic chloride, etc. If catalysts be employed, it is sometimes possible to use lower temperatures and/or shorter periods of time than those indicated above.

In general, I prefer to conduct the polymerization in an inert atmosphere of carbon dioxide, nitrogen or other inert gas. The polymerization is preferably continued until the refractive index, density and average molecular weight approach constant values. At this point the polymerized esters are separated from the unpolymerized esters by any suitable method. In the above examples I have suggested the separation of these esters by distilling off the unpolymerized esters at an absolute pressure of about 1–5 mm. of mercury and at temperatures up to about 300° C. Another way in which this separation may be effected is by extraction with methanol or other suitable solvent. This separation or purification step may be omitted in some instances. The mixture of polymeric acids and monomeric acids or esters thereof thus obtained may be reacted with a suitable amine to form a mixture of amides and polyamides which may be utilized as plasticizers or modifiers for other resinous materials. Generally the crude polymerized esters contain from about 30% to about 75% of polymeric esters.

The purified polymerized esters or the crude mixtures containing them may be hydrogenated to produce substantially saturated products. The hydrogenation may be carried out in any ordinary hydrogenation equipment and either by the static or continuous flow methods. In order to effect the hydrogenation, a hydrogenation catalyst is generally advantageous. For this purpose, a nickel catalyst of the conventional type is quite suitable although other hydrogenation catalysts such as platinum catalysts, palladium catalysts, etc., may be used.

The reaction of the polymeric acids or esters thereof with the amine may be carried out at temperatures between about 180° C. and about 325° C., preferably at about 200° C. If highly volatile amines be utilized, suitable pressure vessels may be required for the reaction. On the other hand, the reaction of most of the amines, particularly the polyamines, is advantageously carried out under reduced pressure, e. g., 1–10 mm. of mercury, after the reaction has proceeded far enough to render the reactants substantially non-volatile.

The time of reaction will vary according to the size of the batch, the heat transfer, the particular reactants employed, etc. The reaction is generally complete in about one-half hour to 8 hours. The reaction is continued for sufficient time to react substantially all of the reactive groups. Acid number determinations and tests for free amino groups will indicate when the reaction is substantially complete. The "amine number" which is indicative of the free amino groups may be determined by titration with benzene azonaphthyl amine. The reaction may be considered to be substantially complete when the acid number and the amine number are each less than about 5 although the reaction is preferably continued until even lower acid or amine numbers are obtained.

Any primary or secondary amine may be used, e. g., methyl amine, propyl amine, cyclohexyl amine, dicyclohexyl amine, dodecyl amine, octadecyl amine, ethylene diamine, tetramethylene diamine, pentamethylene diamine, hexamethylene diamine, octamethylene diamine, decamethylene diamine, p-xylylene diamine, 3-methylhexamethylene diamine, piperazine, diethylene triamine, triethylene tetramine, etc. Obviously various mixtures or any of these amines may be used if desirable.

Part or all of the amines may be substituted with a monoalkylolamine, thereby producing a mixed polyamide-polyester. Examples of these include: monoethanolamine, propanolamine, butanolamine, 2-amino-3-hexanol, 3-amino-4-heptanol, 2-amino-4-pentanol, 5-amino-4-octanol, 3-amino-3-methyl-2-butanol, 3-amino-3-methyl-4-heptanol, 3-amino-2-methyl-4-heptanol and N-substituted alkylol amines such as phenyl-monoethanolamine. The alkylolamines which have side chains are especially desirable in order to obtain resins having good solubility and compatibility characteristics. The monoalkylolamines contain only two reactive groups and, therefore, are particularly suitable for use according to my invention since gelation and infusibility will not occur. Di- and tri-alkylolamines contain more than two reactive groups and tend to gel the reaction materials very rapidly. Furthermore, as in the case of the trialkylolamines, there is the possibility of salt formation which increases the tendency to form gels. Resins produced from di- and trialkylolamines are generally quite water-sensitive.

Various modifiers may also be included such as the amino acids, examples of which include p-amino benzoic acid, hydrogenated p-aminobenzoic acid and amino caproic acids, e. g., epsilon amino caproic acid. Unsubstituted beta-amino acids may not be used inasmuch as they lose ammonia upon heating. On the other hand, alpha, alpha'-disubstituted beta-amino acids may be used inasmuch as they do not lose ammonia. The substituents on the alpha carbon atom may be hydrocarbon radicals, e. g., methyl groups. Diamino acids, triamino acids and other polyamino acids or amides thereof may be used but they tend to gel the material. Generally the amino acids which contain 3 or more methylene groups separating the amino group and the carboxyl group are preferred. These acids may be used either in the acid or lactam form. If they be used in the lactam form, it is preferable that the reaction be conducted in a solvent containing a phenol. While glycine may be used to modify the resins, it is generally undesirable since substantial quantities tend to increase the water solubility or water absorption of the resulting product.

The resins may also be modified with hydroxy acids, e. g., ricinoleic acid, omega-hydroxy decanoic acid, alpha-hydroxy isobutyric acid, lactic acid, etc.

Polyamides prepared from the polymeric acid materials are resinous rather than waxy as in the case of most polyamides. On the other hand, as indicated in Example 3, if part of the ordinary types of dicarboxylic acids used in the production of polyamides be substituted for the polymeric fatty acid materials produced from the polyene fatty acids or their esters, a waxy material similar to the known products often results.

Obviously the relative proportions of the ordinary types of dicarboxylic acids which, when mixed with the polymeric acids obtained from the polyene fatty acids, will produce a waxy material rather than a resinous or balsam type of material, will vary according to the particular acids and the particular amine which is used. In some instances, very small proportions are required, e. g., 10%, whereas in other instances, large proportions of the ordinary dicarboxylic acids are required, e. g., up to about 90%.

The products which are produced from mixtures of the ordinary straight chain types of dicarboxylic acids and the polymeric acids which are utilized herein have considerably different properties with respect to flexibility, toughness, hardness, solubility, etc. These differences in properties frequently enable one to select a resin which is particularly adapted for some special purpose, the desired properties being present in the modified materials, but not being present in the non-modified materials.

Dicarboxylic acids suitable for admixture with the polymeric acids obtained from the polyene fatty acids (or esters thereof) are those which do not form an anhydride upon heating at ordinary atmospheric pressures. Acids having at least 4 carbon atoms between the 2 carboxylic groups are preferred. Examples of suitable acids are: adipic, azelaic, sebacic, terephthalic, hexahydroterephthalic, pimelic, brassylic, etc. It may also be desirable to employ acids having side chains, such as methyl or other lower alkyl groups in order to increase the solubility and compatibility characteristics of some of my resinous materials. Resins made according to my invention may be admixed with drying oil acid constituents, e. g., polymerized drying oils, either before or after condensation or polymerization. Such compositions are particularly desirable in air-drying coating compositions. Some of my resinous materials are particularly suitable in coating compositions because of their relatively high solubility in the usual coating composition solvents.

My resins are suitable for use in the production of artificial fibers, filaments, ribbons and films. Some of my resins are also suitable for use in coating compositions such as lacquers, varnishes, enamels, etc., particularly when mixed with various alkyd resins, especially those of the oil-modified type, or with ester gum, with phenol-formaldehyde resins, with amino-formaldehyde resins, e. g., urea-formaldehyde resins, thiourea-formaldehyde resins, etc. In some instances, the resins may interact if formaldehyde is present or is added.

Obviously suitable fillers, dyes, pigments, etc., may be mixed with the resins in order to produce various commodities.

Many of my resinous materials appear to be useful as antioxidants and plasticizing agents for rubber. They are compatible with and plasticize nitrocellulose, ethyl cellulose and the like.

Obviously many modifications and variations in the processes and compositions described above may be made without departing from the spirit and scope of the invention as defined in the appended claims.

I claim:

1. A process comprising heating at about 180°–325° C. a substance selected from the group consisting of ammonia, primary and secondary amines and alkylolamines with a substance selected from the group consisting of acids and esters thereof obtained by addition polymerization at elevated temperature of a member of the group consisting of polyene fatty acids and their esters.

2. A process comprising heating at about 180°–325° C. a polyamine having at least one replaceable hydrogen with a substance selected from the group consisting of acids and esters thereof obtained by addition polymerization at elevated temperature of a member of the group consisting of polyene fatty acids and their esters.

3. A process comprising heating ethylene diamine at about 180°–325° C. with a substance selected from the group consisting of acids and esters thereof obtained by addition polymerization at elevated temperature of the methyl esters of tung oil fatty acids.

4. A process comprising heating at about 180°–325° C. ethylene diamine with the esters obtained by the addition polymerization at elevated temperature of the methyl esters of tung oil and hydrogenating the polymerized esters.

5. A composition comprising the reaction product obtained by heating at about 180°–325° C. a substance selected from the group consisting of ammonia, primary and secondary amines and alkylolamines with a substance selected from the group consisting of acids and esters thereof obtained by addition polymerization at elevated temperature of a member of the group consisting of polyene fatty acids and their esters.

6. A composition comprising the reaction product obtained by heating at about 180°–325° C. a polyamine having at least one replaceable hydrogen with a substance selected from the group consisting of acids and esters thereof obtained by addition polymerization at elevated temperature of a member of the group consisting of polyene fatty acids and their esters.

7. A composition comprising the reaction product obtained by heating at about 180°–325° C. a diamine having at least one replaceable hydrogen with a substance selected from the group consisting of acids and esters thereof obtained by addition polymerization at elevated temperature of a member of the group consisting of polyene fatty acids and their esters.

8. A composition comprising the reaction product obtained by heating at about 180°–325° C. ethylene diamine with carboxylic acids obtained from the addition polymerization of the methyl esters of tung oil.

THEODORE F. BRADLEY.

---

CERTIFICATE OF CORRECTION.

Patent No. 2,379,413.                            July 3, 1945.

THEODORE F. BRADLEY.

It is hereby certified that error appears in the printed specification of the above numbered patent requiring correction as follows: Page 1, second column, line 42, for "(70.1 diamine)" read --(70.1% diamine)--; and that the said Letters Patent should be read with this correction therein that the same may conform to the record of the case in the Patent Office.

Signed and sealed this 11th day of December, A. D. 1945.

Leslie Frazer (Seal)                        First Assistant Commissioner of Patents.

perature of the methyl esters of tung oil and hydrogenating the polymerized esters.

5. A composition comprising the reaction product obtained by heating at about 180°–325° C. a substance selected from the group consisting of ammonia, primary and secondary amines and alkylolamines with a substance selected from the group consisting of acids and esters thereof obtained by addition polymerization at elevated temperature of a member of the group consisting of polyene fatty acids and their esters.

6. A composition comprising the reaction product obtained by heating at about 180°–325° C. a polyamine having at least one replaceable hydrogen with a substance selected from the group consisting of acids and esters thereof obtained by addition polymerization at elevated temperature of a member of the group consisting of polyene fatty acids and their esters.

7. A composition comprising the reaction product obtained by heating at about 180°–325° C. a diamine having at least one replaceable hydrogen with a substance selected from the group consisting of acids and esters thereof obtained by addition polymerization at elevated temperature of a member of the group consisting of polyene fatty acids and their esters.

8. A composition comprising the reaction product obtained by heating at about 180°–325° C. ethylene diamine with carboxylic acids obtained from the addition polymerization of the methyl esters of tung oil.

THEODORE F. BRADLEY.

---

CERTIFICATE OF CORRECTION.

Patent No. 2,379,413.                   July 3, 1945.

THEODORE F. BRADLEY.

It is hereby certified that error appears in the printed specification of the above numbered patent requiring correction as follows: Page 1, second column, line 42, for "(70.1 diamine)" read --(70.1% diamine)--; and that the said Letters Patent should be read with this correction therein that the same may conform to the record of the case in the Patent Office.

Signed and sealed this 11th day of December, A. D. 1945.

Leslie Frazer (Seal)                   First Assistant Commissioner of Patents.